United States Patent [19]
Alderman et al.

[11] Patent Number: 5,828,056
[45] Date of Patent: Oct. 27, 1998

[54] PHOTOELECTRIC DETECTOR WITH IMPROVED CLEAR CONTAINER FEATURE DETECTION

[75] Inventors: Richard A. Alderman; Kenneth F. Barnes; Bo Su Chen, all of Freeport, Ill.

[73] Assignee: Honeywell Inc., Minneapolis, Minn.

[21] Appl. No.: 742,708

[22] Filed: Nov. 1, 1996

[51] Int. Cl.⁶ .................................................. G01N 9/04
[52] U.S. Cl. ............................... 250/223 B; 356/240
[58] Field of Search ..................... 250/223 B; 356/239, 356/240, 445, 448

[56] References Cited

U.S. PATENT DOCUMENTS 4,289,961  9/1981  Kurth ................................. 250/223 B
5,496,996  3/1996  Barnes et al. ...................... 250/223 B

*Primary Examiner*—Stephone B. Allen
*Attorney, Agent, or Firm*—Roland W. Norris

[57] ABSTRACT

A photodetector is provided with two light sources and a light sensitive component. The use of two light sources significantly reduces the opportunity of a surface feature, or abnormality, from focusing light back toward the light sensitive component in a manner that could possible cause the photodetector to misinterpret the intensified light as being indicative of the absence of an object in the detection zone. The light sources and light sensitive component can be arranged along an axis which is either parallel to the path of the objects to be detected or perpendicular to their path.

25 Claims, 11 Drawing Sheets

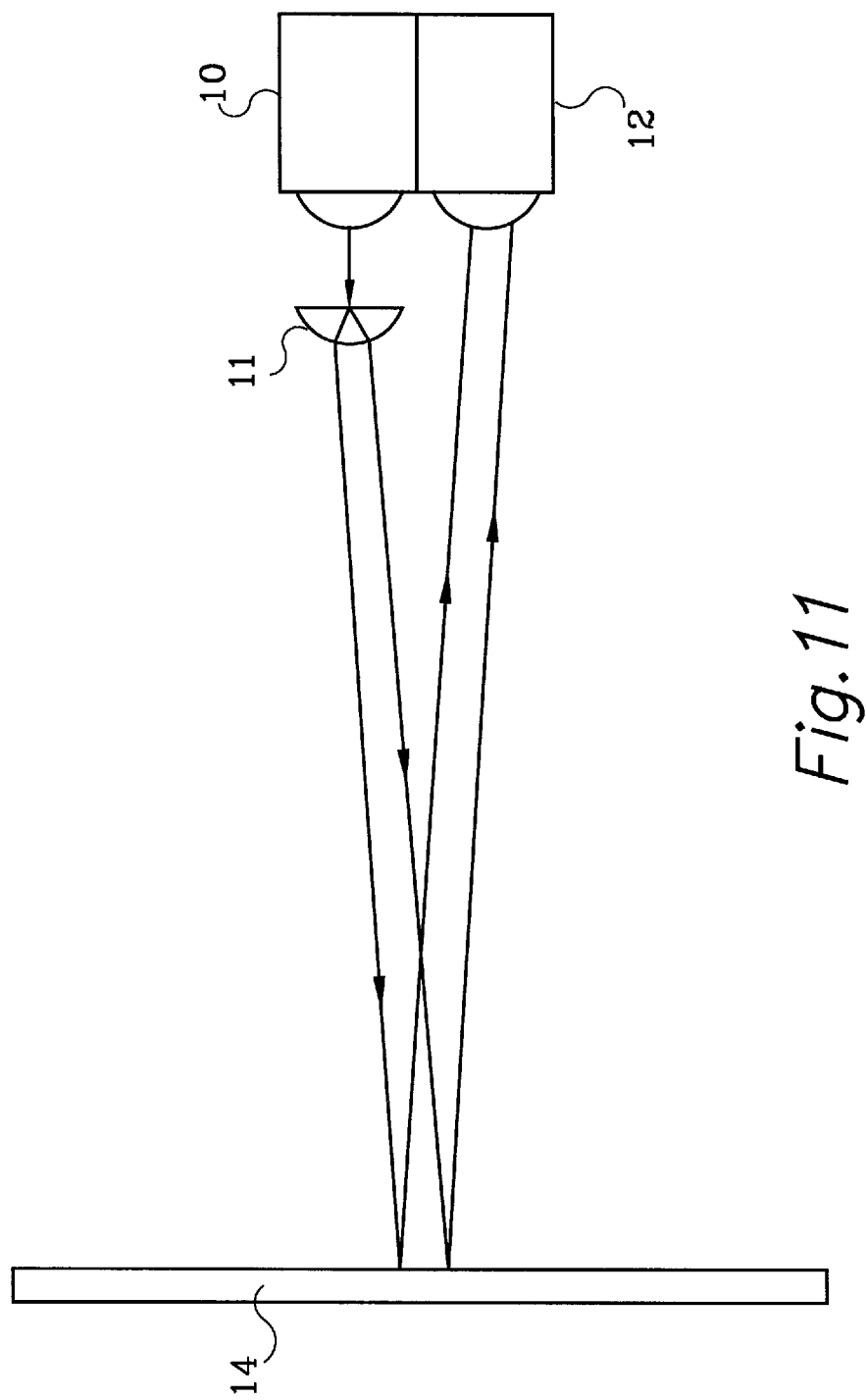

PHOTOELECTRIC DETECTOR WITH IMPROVED CLEAR CONTAINER FEATURE DETECTION

BACKGROUND OF THE INVENTION

1. Field of the Invention

The present invention is generally related to photodetector systems and, more particularly, to a photodetector that is able to discriminate between reflected light received from a reflector when no clear container is within a detection zone and reflection from a surface feature or discontinuity on a clear container.

2. Description of the Prior Art

Many different types of photodetector systems are known to those skilled in the art. Many types of photodetectors are used to detect the presence or absence of an opaque object passing through a detection zone. Other photodetectors, sometimes referred to as clear container sensors, are used to detect the presence or absence of a clear container passing through a detection zone. Many of these detector systems are retroreflective and use a reflector disposed on an opposite side of the detection zone from both the light source and light sensor of the photodetector system. In operation, the photodetector receives a reflected signal after it is reflected by the reflector device. If the reflected beam of light is at a predetermined level of intensity, the system is able to detect the absence of an object in the detection zone. Alternatively, if the reflected beam of light has a reduced intensity, the photodetector determines that an object is in the detection zone and is blocking either the transmitted beam of light or the reflected beam of light.

U.S. Pat. No. 5,496,996, which issued to Barnes et al on Mar. 5, 1996, discloses a photoelectric device with the capability to change threshold levels in response to changing light intensities. The photoelectric sensor is provided with the capability of calculating a threshold magnitude based on a maximum light intensity received by a light sensitive device. The maximum value of the light intensity is determined during a preselected period of time when no object is blocking the path of the light beam. A second threshold magnitude is used to assist the photoelectric sensor in determining the leading edge and trailing edge of a transparent object. The values of the first and second threshold magnitudes are updated dynamically as clear containers pass through the path of the light beam. This permits the photoelectric sensor to react to changes in light intensity without providing false signals of bottles within the light path or missing bottles that are within the light path.

One problem that can occur when a photodetector is used to detect clear containers is that the clear container may have certain features, or abnormalities, in its structure. These features in the structure can focus reflected light back to the photodetector with a greater intensity than would normally be expected when an object is within the detection zone. When this occurs, the light sensor can receive an abnormally strong signal and will interpret the strong signal as being representative of the absence of a bottle. Another troublesome condition can occur when clear containers are being detected. When a clear container is within the detection zone and expected to block or significantly attenuate the transmitted and reflected light beams, the transmitted light beam can partially pass through the first surface it encounters at the front portion of the clear container and a portion of the remaining light beam can be reflected by the back surface of the clear container after the light beam has passed through the front surface. Under certain conditions, the double reflecting nature of a clear container can reflect sufficient light back to the photosensor to simulate the absence of an object in the detection zone. Even when polarized light is used, the polarized light can pass through a container's first surface, particularly if the container is made of clear plastic, and the polarized light can be partially depolarized. The light reflected from the back surface of the container is transmitted through the front surface again, experiencing more depolarization. If the angles of reflection are within a certain range, the reflected light is directed back toward the light sensitive component of the photodetector. The depolarized light then passes through the polarization filter in front of the light sensitive component, whose purpose is to filter the specular reflection of light that has not been depolarized, and erroneous detection can occur. The photodetector detects two types of light beams. One is the reflected beam of light from the reflector and the other is the reflected beam of light from the bottle's second surface. The combined signal level of the two beams of light reflected by the bottle's two surfaces can actually be much higher than the predefined threshold and can result in the detection of the absence of a bottle even though a bottle is present in the detection zone. Either of these two conditions can possibly cause a photodetector to falsely determine that object is in the detection zone even when a clear container is disposed directly between the photodetector and the reflector.

Most known photoelectric devices for sensing clear containers also exhibit a problem in that they can detect certain container structure features and can, under certain conditions, detect these imperfections or abnormalities as individual containers by interpreting certain focused intensities of reflected signals as being indicative of the absence of a container in the detection zone. The photodetector described in U.S. Pat. 5,496,996 applies automatic compensation technology and solves many of the problems associated with the detection of transparent containers. However, the problem presented by surface features on a clear container can sometimes be interpreted incorrectly. These problems can cause the photodetective system to give false detections of containers when the same individual container is stationary or slowly moving through the detection zone. Since the container is moving slowly through the detection zone, many such false detections can occur from the semi-stationary container.

A second unfortunate situation can occur when the bottle, usually a glass container, causes extra light energy to be concentrated back to the light sensitive component because of the presence of a surface or structural feature or abnormality in the structure or on the surface of the bottle. The intensified light, combined with the proper angles and the depolarization effect described above, can also exceed the predefined threshold and cause the photodetector to interpret the absence of a bottle when a bottle is actually present within the detection zone. Either of these two circumstances can cause false sensor indications which indicate multiples of objects when only one clear container is actually in the detection zone.

It would be therefore significantly beneficial if a photodetector could be provided which is able to discriminate between a condition where light is normally reflected by a reflector in the absence of an object in the detection zone and a condition caused by abnormal reflection or focused reflection of light from features or abnormalities in the surface of the object.

SUMMARY OF THE INVENTION

Through many experiments, it has been determined that bottle features create problems wherein higher than normal reflected beams of light cause increased signal levels provided by a light sensitive component even when an object is within the detection zone and expected to interfere with the normal passage of light in the transmitted and reflected beams of light. This abnormality occurs in relatively small regions of the container and when the light is directed toward the container at specific angles. An abnormality or surface feature on the surface of a bottle which causes this problem will probably be surrounded by many surface regions which would not normally cause the bottle feature reading problem. Therefore, if two areas of the structure of the container are scanned at generally the same time, but at two different angles, the probability of both transmitted beams of light and both reflected beams of light, at different angles, causing the problem will be considerably reduced.

The present invention provides a system using two light emitting diodes which transmit beams of light over two separate optical paths to a reflector disposed on an opposite side of the detection zone. Both transmitted beams of light are reflected and the reflected beams are detected by a common light sensitive component. The transmitting LED's are sequentially pulsed in an alternate fashion. The light sensitive component sequentially detects both of the reflected beams of light resulting from the two different transmitted beams of light at alternating pulses. The logic system within the photodetector controls the LED's through a pulser device and monitors both signals provided by the light sensitive component in response to receipt of the two reflected beams of light. The present invention distinguishes between two conditions, a "background" mode when no clear container is located within the detection zone of the sensor and a "bottle" mode when a clear container is disposed within the detection zone. In order to change modes, the present invention requires that both optical paths agree on the changed condition. In other words, to change from the "background" mode to the "bottle" mode, both optical paths must be affected sufficiently to cause the related signals to decrease sufficiently to be less than a predetermined threshold. Conversely, to change from the "bottle" mode to the "background" mode, both optical paths must be unobstructed so that their related signals are both above the predetermined threshold. While in the "bottle" mode, the present invention always selects the lower of the two signals and, as a result, remains in the "bottle" mode as long as at least one of the signals is below a predefined threshold. This allows the present invention to ignore spurious high signals that might be caused by abnormalities in the structure of the clear container or on its surface. Also, it allows the present invention to ignore spurious high signals that might be caused by the additive nature of the light beams reflected by the front and back surfaces of the clear container. In the "bottle" mode of the photodetector, the higher value of the two pulses is discarded under the assumption that it might be caused by a bottle surface feature. The smaller signal is then retained as being presumptively more valid than the higher signal. Throughout the Description of the Preferred embodiment, the photodetector system will be described in terms of a single photodetector in combination with two light emitting diodes. However, it should be clearly understood that the advantageous concept of the present invention is limited only by the provision of two optical paths between one or more light sources and one or more light sensitive components. As an example, rather than using a single photodetector with a pair of light emitting diodes, the present invention could be equally advantageous if a single light emitting diode was used in combination with beam splitting optics or opto-mechanical means such as shutters, moving mirrors, etc. to produce two apparent light sources from a single emitter. The important element of the present invention is that it incorporates two optical paths, between light sources and light sensors, which avoid the problems that can otherwise occur as a result of an abnormality in the structure or surface of a clear container.

When a clear container moves into the detection zone and both signals, representing the two reflected beams of light at different angles, fall below a predefined threshold, a container is detected. At that time, a leading edge of the bottle detection condition is identified and an output signal is provided. The photodetector changes from background mode to detection or "bottle" mode when this occurs. When the container leaves the detection zone, and both signals representing the two reflected beams of light reach a magnitude greater than the predefined threshold, the sensor responds with a trailing edge indication and a corresponding signal is generated. The device then transitions back to the background mode, looking for both signals to again fall below the predefined threshold. Since it would take both reflected beams of light to be above or below the predefined threshold to change modes, but only the lowest signal to retain the "bottle" or detection mode, the probability of reading bottle features as the absence of an object in the detection zone is greatly reduced because it is unlikely that both reflected beams would either be at the proper angle to reflect light from the surface feature to the light sensitive component or that both beams would pass through the feature or abnormality when it is at the same location. Therefore, applying two LED's and comparison technology eliminates the likelihood of erroneous high signal level detection, caused by a surface feature on the bottle, which would indicate the absence of a bottle when a bottle is actually within the detection zone.

A preferred embodiment of the present invention provides a photodetector that comprises a reflector. In addition, it comprises a first light source which is positioned to direct a first beam of light in a direction toward the reflector and through a detection zone. A second light source is positioned to direct a second beam of light in a direction toward the reflector and through the detection zone. In addition, the present invention comprises a light sensitive component which is positioned to receive the first beam of light and provide a first signal which is representative of the intensity of a first reflected beam of light when the first beam of light is reflected back toward the light sensitive component. It is also positioned to receive the second beam of light and provide a second signal which is representative of the intensity of a second reflected beam of light when the second beam of light is reflected back toward the light sensitive component. A pulser is provided for alternately energizing the first and second light sources in order to alternately produce the first and second beams of light. At least one of the first and second beams of light is affected when an object to be detected is within the detection zone. The present invention further comprises a comparator for comparing the first and second signals to a predefined threshold. Furthermore, the present invention comprises a means for determining the presence of the object to be detected within the detection zone when a magnitude of at least one of the first and second signals is less than the predefined threshold.

In a preferred embodiment of the present invention, the light sensitive component is disposed between the first and second light sources and, in addition, the first and second light sources are light emitting diodes. Although the present invention can be used to detect many different types of objects in the detection zone, a preferred embodiment of the present invention is intended to detect an object which is partially transparent.

In one particularly preferred embodiment of the present invention, the photodetector is provided with a first means for detecting a leading edge of the object to be detected when both of the first and second signals are less than the predefined threshold after both of the first and second signals had been greater than the predefined threshold for a predetermined period of time. In addition, it comprises a second means for detecting a trailing edge of the object to be detected when both of said first and second signals is greater than the predefined threshold after the leading edge had been detected.

In a typical application of the present invention, the object to be detected is disposed on a conveyor in order to move it along a path which extends through the detection zone. The light sensitive component and the first and second light sources can be aligned along an axis which is generally parallel to the path along which the object to be detected is disposed or, alternatively, the axis can be generally perpendicular to the path along which the object to be detected is intended to move on the conveyor.

BRIEF DESCRIPTION OF THE DRAWINGS

The present invention will be more fully and completely understood from a reading of the Description of the Preferred Embodiment in conjunction with the drawings, in which:

FIG. 11 represents a variant of the preferred embodiment.

DESCRIPTION OF THE PREFERRED EMBODIMENT

Figure 1:
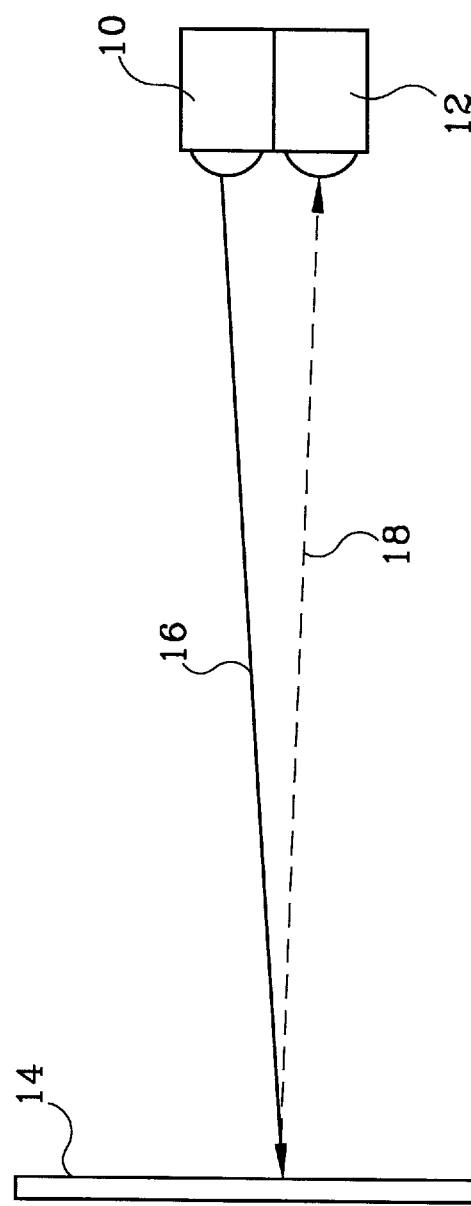
FIGS. 1–3 illustrate the operation of known photodetectors and the possible errors that can be caused by their use.

Throughout the Description of the Preferred Embodiment, like components will be identified by like reference numerals. In order to fully appreciate the advantages provided by the present invention, it is important to understand the manner in which known photodetectors operate.

FIG. 1 illustrates a known type of photodetector system. A light source 10 and a light sensitive component 12 are arranged in association with a reflector 14 in such a manner that a transmitted beam of light 16 impinges upon the reflector 14 and a reflected beam of light 18 returns in a direction toward the light sensitive component 12. If a detection zone is defined as the region between the reflector 14 and the combination of the light source 10 and the light sensitive component 12, an object passing through the detection zone will affect either the transmitted beam of light 16, the reflected beam of light 18, or both. This enables the photodetector to determine that an object is in the detection zone.

Figure 2:
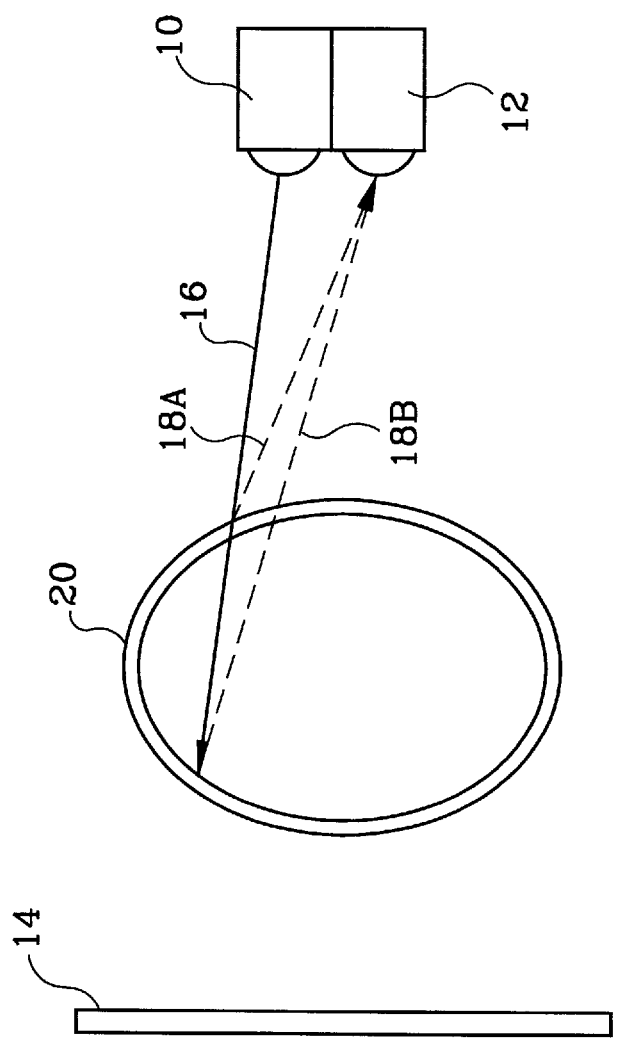

FIG. 2 shows one type of problem that sometimes occurs when known photodetectors are used to detect a clear container. In FIG. 2, a clear container 20 is shown disposed within the detection zone between the light source 10, the light sensitive component 12 and the reflector 14. A transmitted beam of light 16 is partially reflected by the front surface of the clear container 20 and a reflected beam of light 18A travels back toward the light sensitive component 12. In addition, as the transmitted beam of light 16 passes through the hollow container 12, it is again reflected by the back surface and a second reflected beam of light 18B passes in a direction toward the light sensitive component 12. In certain circumstances, the combined effect of the two reflected beams of light, 18A and 18B, can provide sufficient light intensity to cause the light sensitive component 12 to interpret the return signal as indicating the absence of an object in the detection zone.

Figure 3:
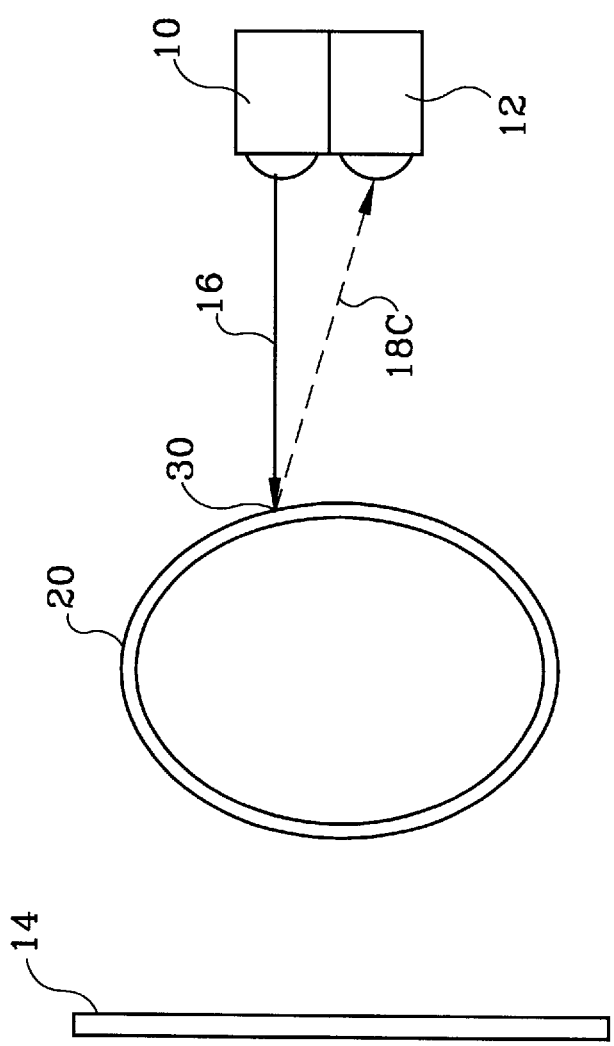

In FIG. 3, another potential problem is illustrated. Occasionally, the clear container 20 will have a surface abnormality 30 which, in effect, focuses the light from the transmitted beam 16 back toward the light sensitive component 12. If the focusing effect of the abnormality 30, or bottle feature, is sufficient, the reflected beam of light 18C will be of a sufficient intensity to cause the photodetector to interpret the reflected light as indicative of light reflected by the reflector 14 when no object is in the detection zone.

Figure 4:
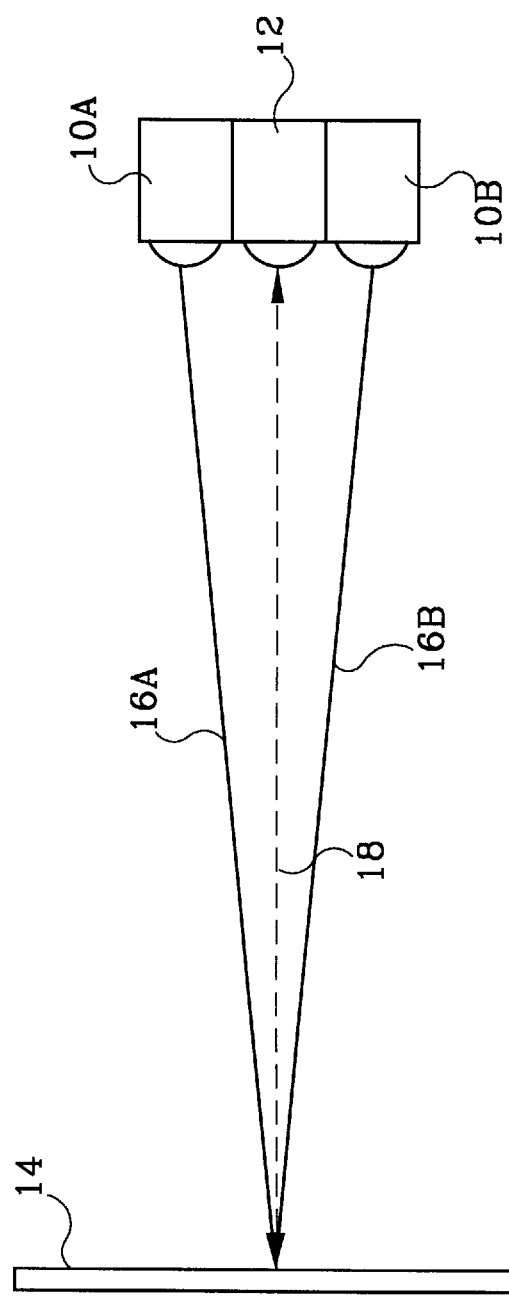
FIG. 4 shows the arrangement of the present invention and the paths of transmitted and reflected beams of light when no object is present in a detection zone.

FIG. 4 shows a simplified schematic illustration of the present invention. It utilizes a reflector 14 in a manner similar to known photodetector systems. It also utilizes a light sensitive component 12 to receive a reflected beam of light 18. In order to avoid the problems described above, which can occur in known photodetector systems, the present invention provides a first light source 10A and a second light source 10B. These two light sources are alternatively energized to sequentially provide transmitted beams of light, 16A and 16B. As a result, when no object in is the detection zone, the light sensitive component 12 receives alternating reflected signals 18 causes by the sequential reflection of transmitted beams of light 16A and 16B.

Figure 5:
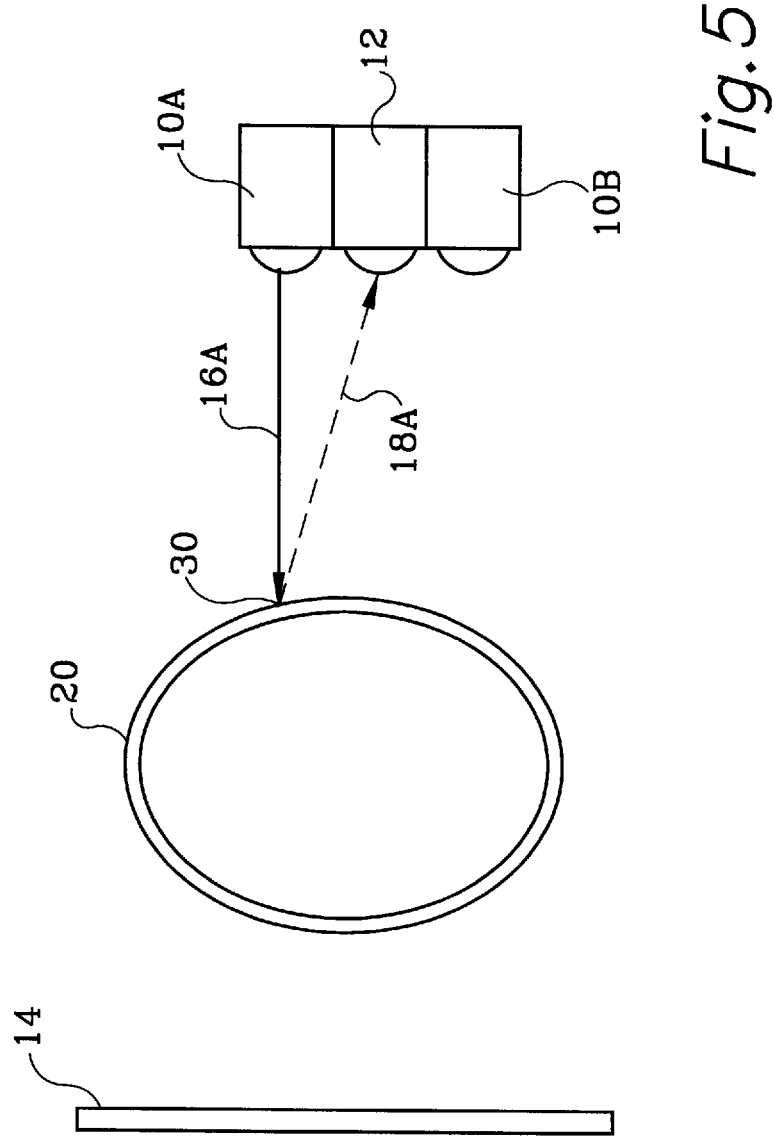
FIG. 5 shows the passage of light from a first light source to a light sensitive component when it is reflected by a clear container.

FIG. 5 shows how the present invention reacts to the existence of an abnormality 30, or surface feature, which could otherwise cause a misinterpretation as described above in conjunction with FIG. 3. When a transmitted beam of light 16A is focused by the abnormality 30 and an intensified reflected beam of light 18A is received by the light sensitive component 12, the intensified signal could be misinterpreted as an indication of the absence of a clear container 20 in the detection zone. This would resemble the reaction to the abnormality 30 by the conventional photodetector described above in conjunction with FIG. 3. However, as described above, the first and second light sources, 10A and 10B, are sequentially energized by the present invention. The transmitted beam of light 16B in FIG. 6 would not strike the abnormality or surface feature in the same manner as the transmitted beam of light 16A described above in conjunction with FIG. 5. Therefore, the reflected beam of light 18B in FIG. 6 would not be intensified in the same way by the focusing characteristic of the abnormality. A lower intensity of reflected beam of light 18 in FIG. 6 would be significantly less than the focused intensity of the reflected beam of light 18 in FIG. 5. The present invention provides a means for interrogating each of the return signals resulting from the reflection of the two transmitted signals, 16A and 16B, in order to significantly reduce the probability of a surface feature or abnormality focusing and intensifying a reflected signal toward the light sensitive component 12.

Figure 7:
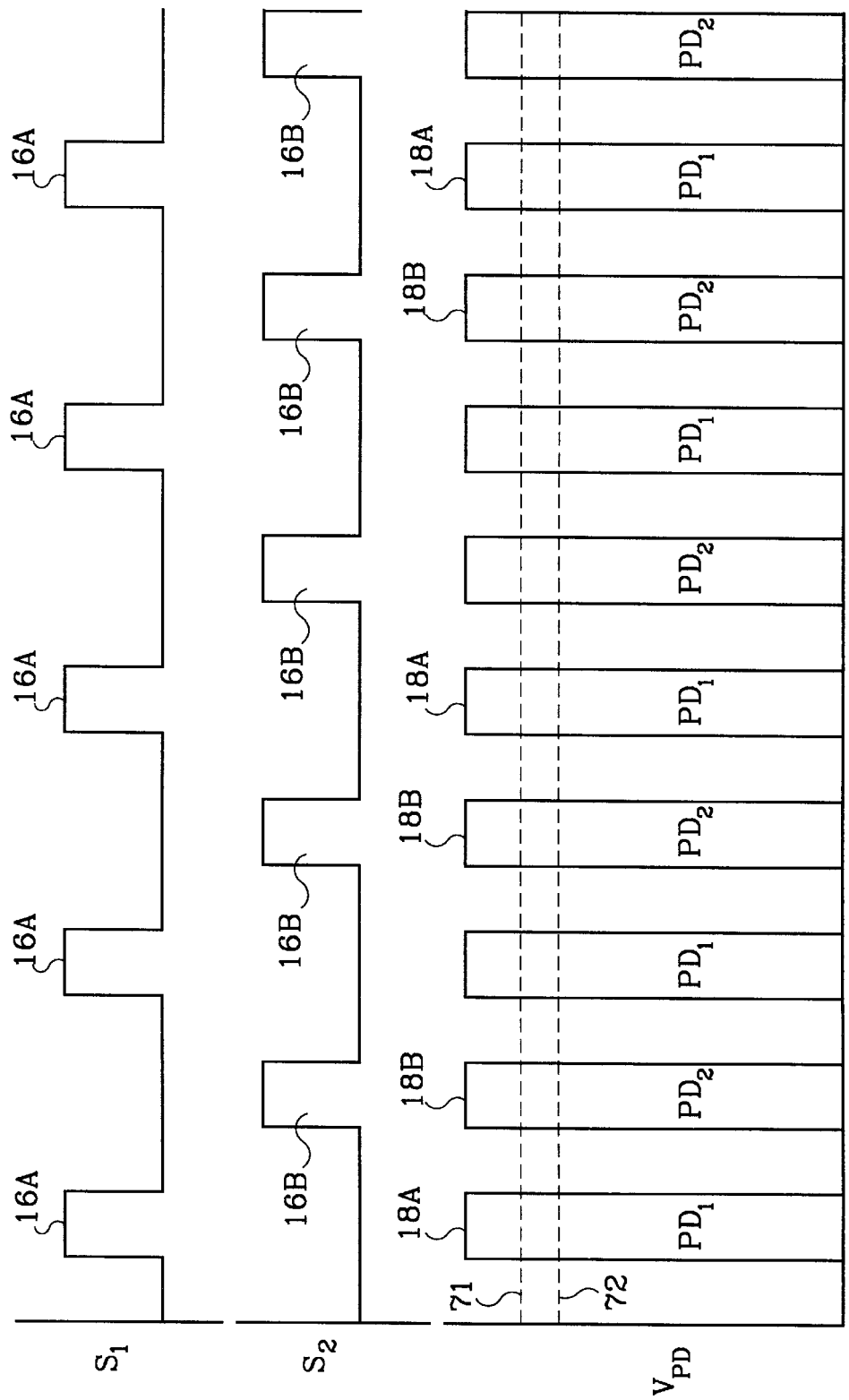
FIG. 7 represents the signals which cause the light sources to be energized and also illustrate the magnitudes of the signals provided by a light sensitive component when the reflected beams of light are received.

The operation of the present invention, when no object is in the detection zone, is illustrated in FIGS. 4 and 7. In FIG. 7, signal $S_1$ represents the pulses which energize light source 10A to provide intermittent beams of light identified by reference numeral 16A in FIGS. 4 and 7. Similarly, signal $S_2$ illustrates the intermittent energization of light source 10B to provide momentary beams of light 16B. With no object to be detected within the detection zone, the beams of light are reflected by the reflector 14 and return toward the light sensitive component 12. The light signals provided by the light sensitive component 12 are identified in FIG. 7 as $PD_1$ and $PD_2$. Theses signals are also identified by reference numerals 18A and 18B to show which of the reflected beams of light caused the magnitude VPD of the two series of alternating signals. A predefined threshold is defined by two magnitudes identified by reference numerals 71 and 72. The upper threshold 71 and the lower threshold 72 define a predefined threshold region used by the present invention to determine whether or not the plurality of signals, 18A and 18B, represent the presence or absence of an object to be detected within the detection zone. In a preferred embodiment of the present invention, two threshold magnitudes, 71 and 72, are used to provide hysteresis for the operation of the photodetection. In other words, the signals, 18A and 18B, are determined to be below the predefined threshold when they are reduced to a magnitude less than the lower threshold 72 and are determined to rise again above the predefined threshold when their magnitude increases to a value greater than the upper threshold 71. In FIG. 7, both signals, 18A and 18B, are above the predefined threshold and indicate that no object is within the detection zone.

Figure 8:
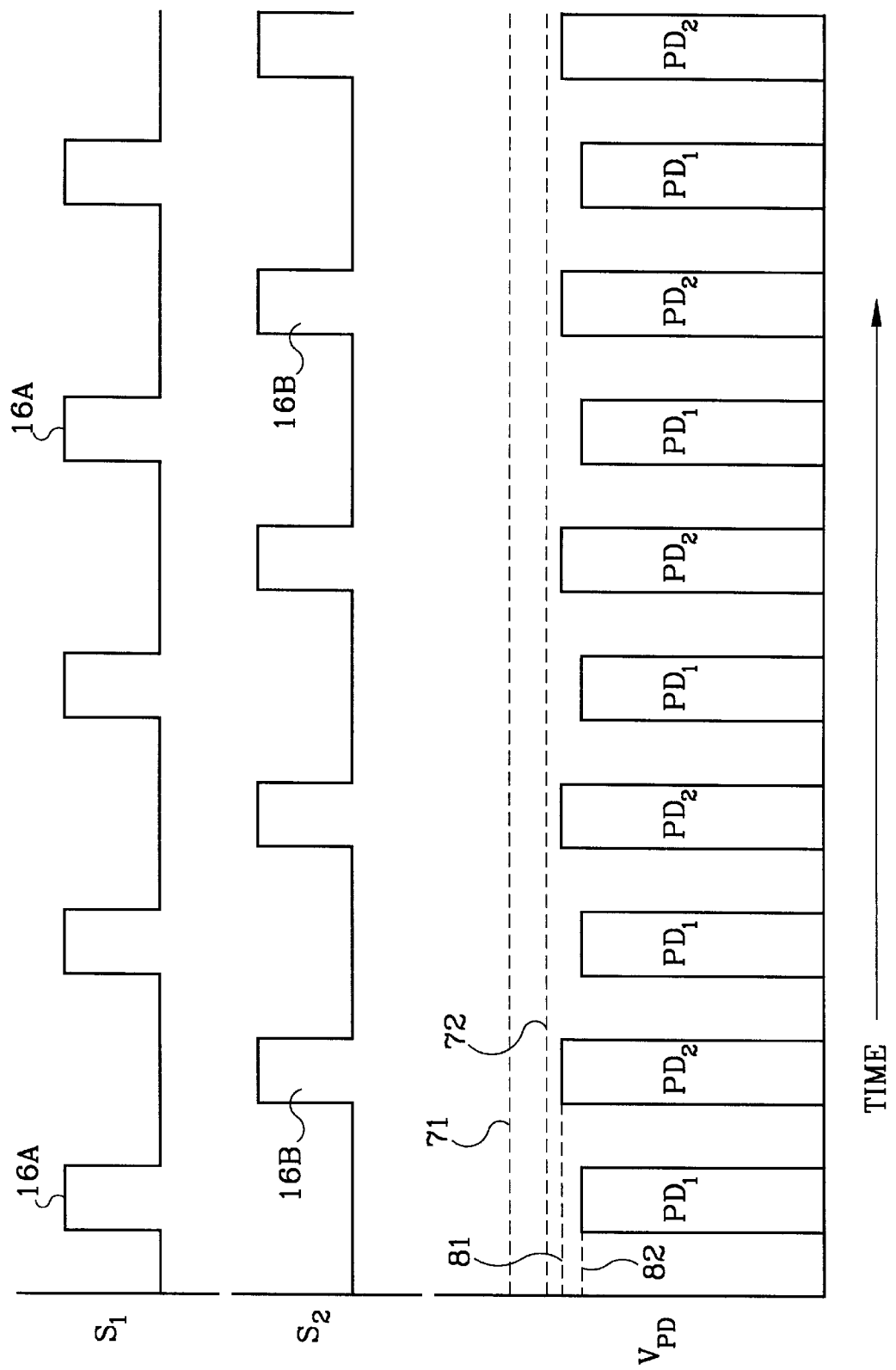
FIG. 8 is generally similar to FIG. 7, but the magnitudes of reflected light are reduced to represent the presence of an object within the detection zone.

With reference to FIG. 8, the magnitudes $V_{PD}$ of the signals, 18A and 18B, indicate that they are both below the lower threshold 72. For purposes of this illustration, the magnitude of signal 18B is represented by dashed line 81 and the magnitude of signal 18A is represented by dashed line 82. The circumstances illustrated in FIG. 8 represent a condition where an object is within the detection zone and the intensity of light received by the light sensitive component 18 is affected by the object for both beams of light, 16A and 16B, which are reflected by the object and do not pass freely through the detection zone to the reflector 14.

Figure 6:
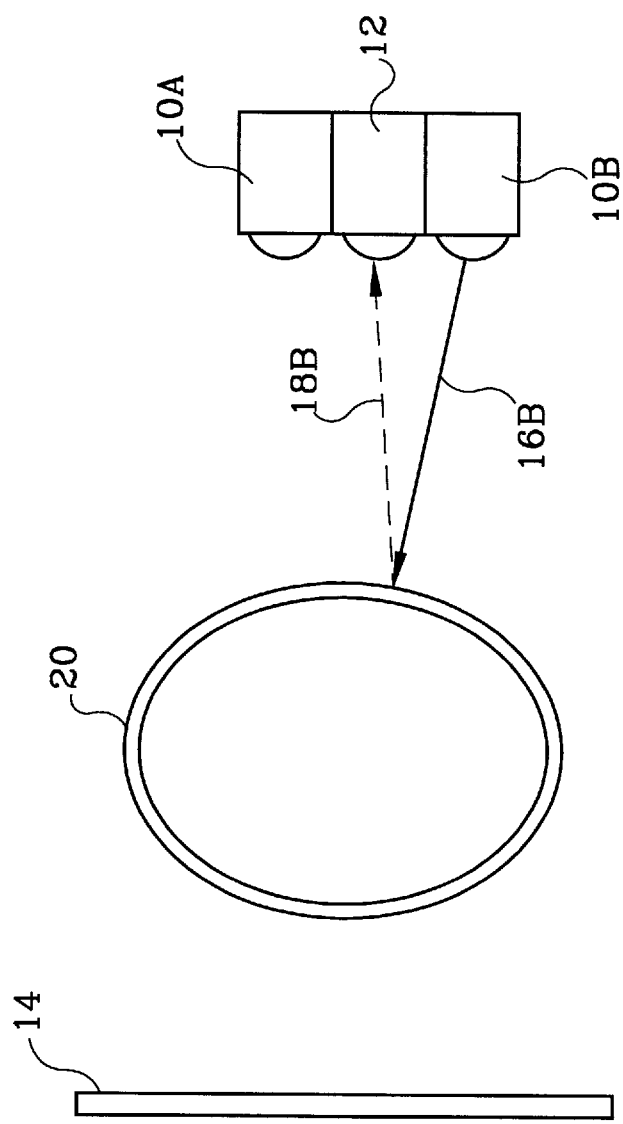
FIG. 6 shows the transmitted light and reflected light from a second light source when an object is in the detection zone.
Figure 9:
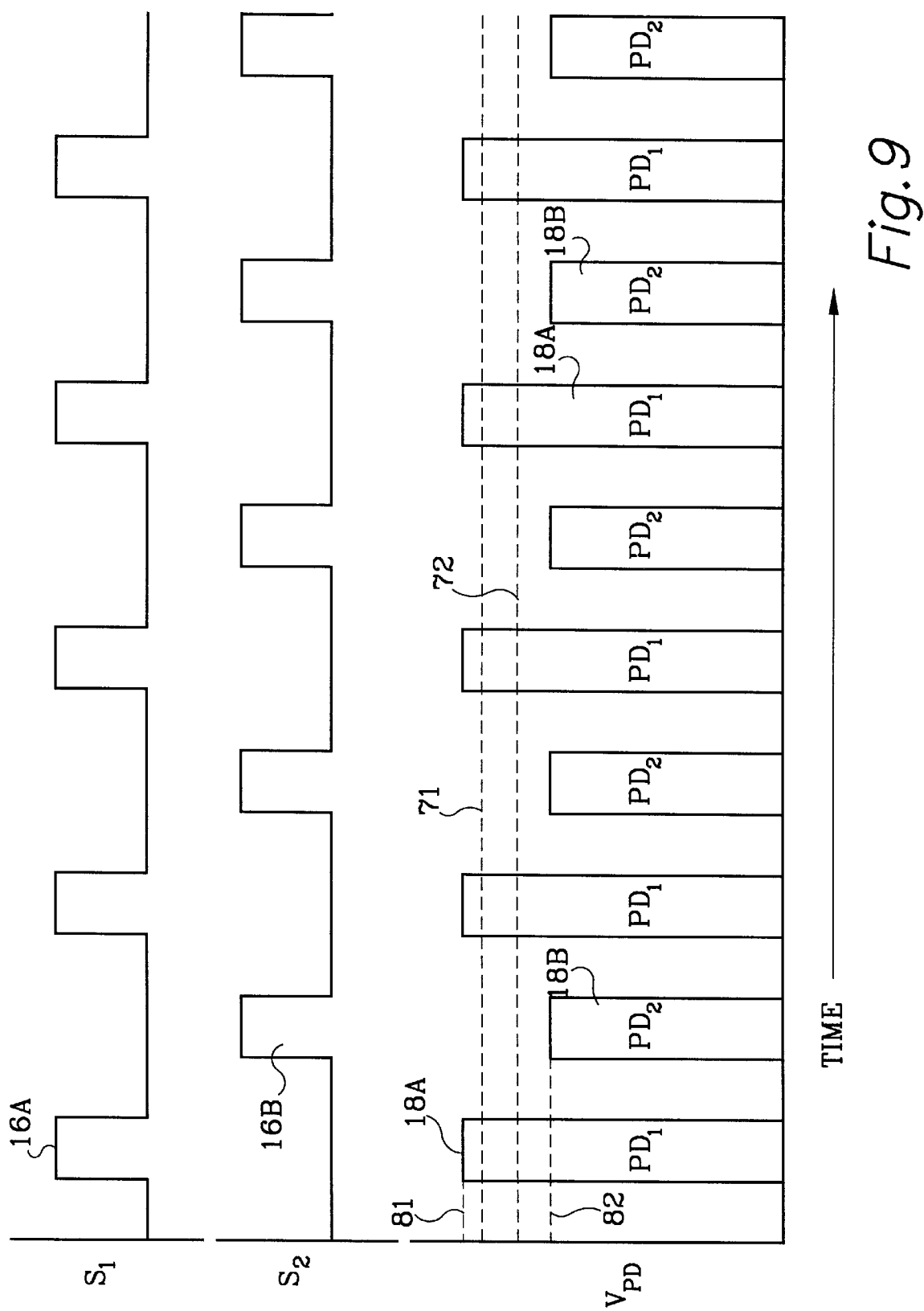
FIG. 9 is generally similar to FIG. 7, but illustrates the magnitudes of the reflected beams of light and the resulting signals when one of the beams of light is reflected by a surface feature on a clear container.

FIGS. 5, 6 and 9 illustrate a condition where an object is within the detection zone, but a surface feature 30 exists on the clear container 20. The surface feature 20 causes light from the beam of light 16A to be focused back toward the light sensitive component 12 in a manner that intensifies the light to a magnitude greater than would normally be expected. This focusing of the beam of light causes the reflected beam of light 18A to be sensed by the light sensitive component 12 in a way that could possibly represent a reflected beam of light received from the reflector as a result of no object being in the detection zone. Since it is highly unlikely that a surface feature 30 will focus the beams of light from both light sources, 10A and 10B, the reflected light 18B received when light source 10B is energized is at a level that is more nearly normal and expected under the circumstances. As can be seen in FIG. 9, the magnitude of signal 18A is represented by dashed line 81 which is greater than the predefined threshold and the magnitude of signal 18B is represented by dashed line 82 which is less than the predefined threshold. Since one of the two signals is less than the predefined threshold, the present invention interprets the situation as representing the presence of an object within the detection zone. If the present invention was not utilized, the surface feature 30 would cause the photodetector to interpret these circumstances as representing the absence of an object in a detection zone. Therefore, FIG. 9 illustrates how the present invention is able to withstand possible focused reflections and the false results that could otherwise be caused if only a single light sensitive component is used.

Figure 10:
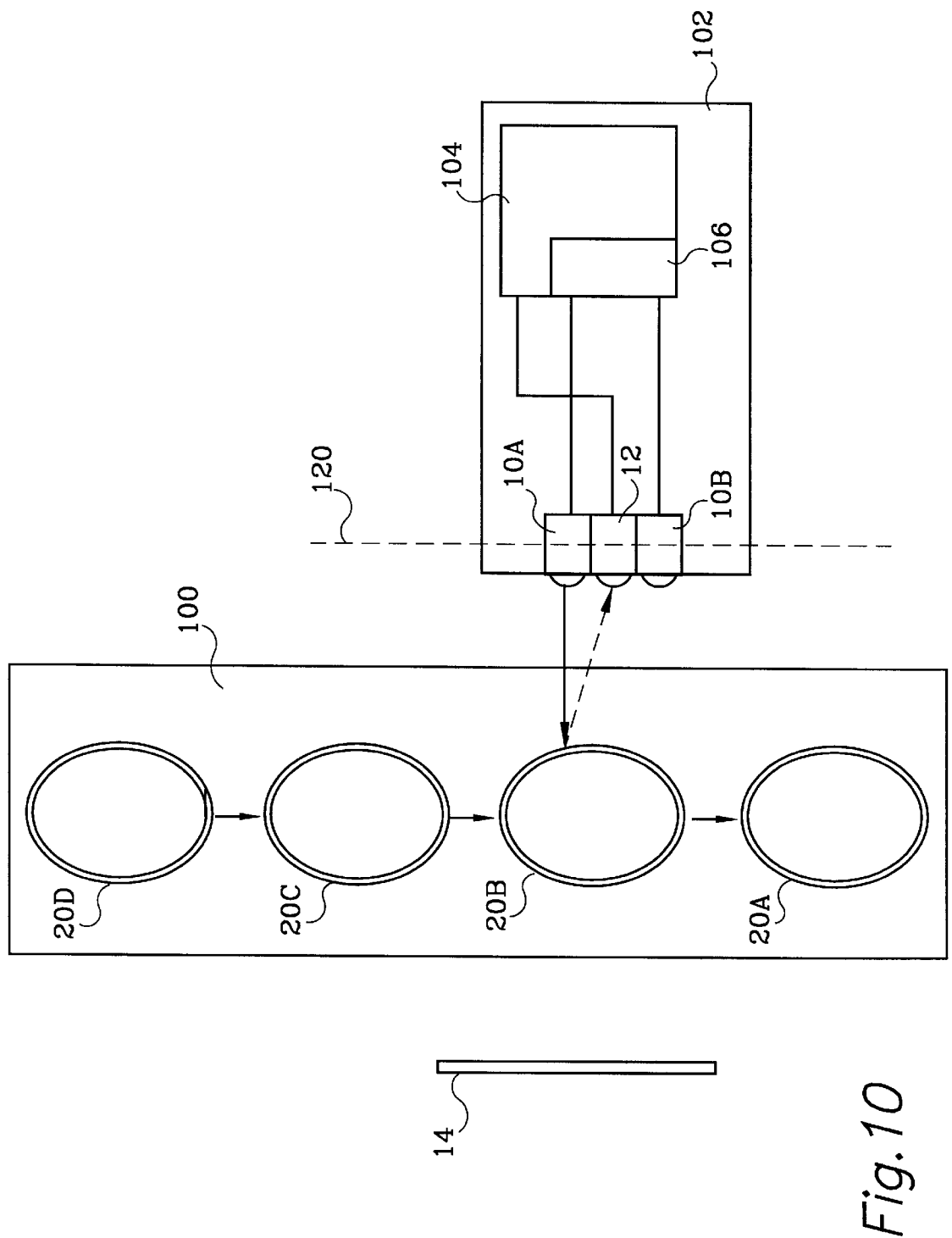
FIG. 10 shows a top view of one possible application of the present invention.

FIG. 10 illustrates a typical application of the present invention. Four objects, 20A, 20B, 20C and 20D, are shown passing along a path represented by the arrows extending from them. The objects are disposed on a conveyor 100 which causes the objects to sequentially move through the detection zone of the photodetector. A housing 102 contains the two light sources, 10A and 10B, and the light sensitive component 12 within its structure. A microprocessor 104, which could be replaced by discrete components or an application specific integrated circuit (ASIC), is used to energize the light sources in an alternating manner. A pulser 106 is controlled by the microprocessor 104 to accomplish this function. The signals provided by the light sensitive component 12 are received by the microprocessor 104 and compared to the predefined threshold.

With continued reference to FIG. 10, the microprocessor continues to monitor the signals received from the light sensitive components and compare them to the predefined threshold in order to determine whether or not an object is disposed within the detection zone. Although many different algorithms can be employed for these purposes, one possible algorithm would determine that a leading edge of an object is passing through the detection zone when one or both of the signals from the light sensitive component 12, in response to the energization of the two light sources, 10A and 10B, is below the predefined threshold. When this occurs, the microprocessor 104 determines that the leading edge of an object is passing through the detection zone. Once this occurs, the microprocessor 104 will conclude that the object remains in the detection zone as long as at least one of the two signals, 18A or 18B, is below the predefined threshold. When both of the signals, 18A and 18B, return to magnitudes greater than the predefined threshold, the microprocessor 104 interprets this situation as representing the passage of a trailing edge of an object out of the detection zone. In this way, the microprocessor 104 can accurately count the objects passing along the conveyor 100 without making incorrect assumptions regarding the presence or absence of an object within the detection zone.

With continued reference to FIG. 10, dashed line 120 represents an axis extending through the light sensitive component and both light sources, 10A and 10B. In one embodiment of the present invention, axis 120 is generally parallel to the path of the objects, as represented by the arrows which illustrate the direction along which the objects pass through the detection zone. An alternative embodiment of the present invention, not illustrated, could dispose the axis 120 in a direction into the page of FIG. 10 and generally perpendicular to the path represented by the arrows extending downward in FIG. 10.

Referencing FIG. 11, it will of course be appreciated that a single emitter 10 can be used with beam splitting optics 11 or the like to produce the two light paths necessary for operation of the present invention.

By providing two light sources in combination with the light sensitive component and by comparing the signals of both reflected beams of light in the manner described above, the present invention is able to detect clear containers much more accurately than known photodetector systems. Although the present invention has been described in considerable detail and illustrated with particular specificity to describe one preferred embodiment of the present invention, alternative embodiments are also within its scope. For example, a preferred embodiment of the present invention uses light emitting diodes as the light sources. Other light sources could also be used. In addition, a preferred embodiment of the present invention utilizes polarized light to further reduce the possibility of erroneous detection of the presence or absence of a clear container. However, this is not a requirement in all embodiments of the present invention. Furthermore, although FIG. 10 shows the axis 120 arranged in parallel association with the path of the objects, a perpendicular arrangement is also possible.

The embodiments of the invention in which an exclusive property or right is claimed are defined as follows:

1. A photodetector system, comprising:
   a photodetector and a light source for placement on a first side of a conveyor of target objects;
   a reflector for placement on a second side of the conveyor of target objects;
   means operatively associated with said light source for providing a first optical path and a second separate optical path;
   said first optical path comprising a first beam of emitted light extending from said light source to said reflector and a first beam of reflected light extending from the reflector back toward said photodetector;
   said second separate optical path comprising a second beam of emitted light extending from said light source through a detection zone between the light source and said reflector to said reflector and a second beam of reflected light extending from the reflector back toward said photodetector;
   said first and second reflected beams being received to produce first and second signals which are representative of the intensity of light received by said photodetector along said first and second optical paths, respectively;
   at least one of said first and second optical paths being affected when an object to be detected is within said detection zone;
   a comparator for comparing said first and second signals to a predefined threshold; and
   means for determining the presence of said object to be detected within said detection zone when a magnitude of at least one of said first and second signals is less than a predefined threshold.

2. The photodetector system of claim 1, wherein:
   said photodetector system comprises a light sensitive component disposed between first and second light sources.

3. The photodetector system of claim 2, wherein:
   said first and second light sources are light emitting diodes.

4. The photodetector system of claim 2, wherein:
   said light sensitive component and said first and second light sources are aligned along an axis which is generally parallel to said path.

5. The photodetector system of claim 2, wherein:
   said light sensitive component and said first and second light sources are aligned along an axis which is generally perpendicular to said path.

6. A photodetector system, comprising:
   a reflector;
   a first light source, said first light source being positioned to direct a first beam of light in a direction toward said reflector and through a detection zone;
   a second light source, said second light source being positioned to direct a second beam of light in a direction toward said reflector and through said detection zone;
   a light sensitive component, said light sensitive component being positioned to provide a first signal which is representative of the intensity of a first reflected beam of light when said first beam of light is reflected back toward said light sensitive component, said light sensitive component being positioned to provide a second signal which is representative of the intensity of a second reflected beam of light when said second beam of light is reflected back toward said light sensitive component;
   a pulser for alternatively energizing said first and second light sources to alternatively produce said first and second beams of light, at least one of said first and second beams of light being affected when an object to be detected is within said detection zone;
   a comparator for comparing said first and second signals to a predefined threshold; and
   means for determining the presence of said object to be detected within said detection zone when a magnitude of at least one of said first and second signals is less than said predefined threshold.

7. The photodetector system of claim 6, wherein:
   said light sensitive component is disposed between said first and second light sources.

8. The photodetector system of claim 7, wherein:
   said first and second light sources are light emitting diodes.

9. The photodetector system of claim 8, wherein:
   said object to be detected is a partially transparent object.

10. The photodetector system of claim 9, further comprising:
    first means for detecting a leading edge of said object to be detected when at least one of said first and second signals is less than said predefined threshold after both of said first and second signals had been greater than said predefined threshold for a predetermined period of time; and
    second means for detecting a trailing edge of said object to be detected when both of said first and second signals is greater than said predefined threshold after said leading edge had been detected.

11. The photodetector system of claim 7, wherein:
    said object to be detected is disposed on a conveyor to move along a path which extends through said detection zone.

12. The photodetector system of claim 11, wherein:
    said light sensitive component and said first and second light sources are aligned along an axis which is generally parallel to said path.

13. The photodetector system of claim 11, wherein:
    said light sensitive component and said first and second light sources are aligned along an axis which is generally perpendicular to said path.

14. A photodetector system, comprising:

a reflector;

a first light source, said first light source being positioned to direct a first beam of light in a direction toward said reflector and through a detection zone;

a second light source, said second light source being positioned to direct a second beam of light in a direction toward said reflector and through said detection zone, said first and second light sources being light emitting diodes;

a light sensitive component, said light sensitive component being positioned to provide a first signal which is representative of the intensity of a first reflected beam of light when said first beam of light is reflected back toward said light sensitive component, said light sensitive component being positioned to provide a second signal which is representative of the intensity of a second reflected beam of light when said second beam of light is reflected back toward said light sensitive component;

a pulser for alternatively energizing said first and second light sources to alternatively produce said first and second beams of light, at least one of said first and second beams of light being affected when an object to be detected is within said detection zone;

a comparator for comparing said first and second signals to a predefined threshold; and means for determining the presence of said object to be detected within said detection zone when a magnitude of at least one of said first and second signals is less than said predefined threshold.

15. The photodetector system of claim 14, wherein:

said light sensitive component is disposed between said first and second light sources.

16. The photodetector system of claim 15, wherein:

said object to be detected is a partially transparent object.

17. The photodetector system of claim 16, further comprising:

first means for detecting a leading edge of said object to be detected when at least one of said first and second signals is less than said predefined threshold after both of said first and second signals had been greater than said predefined threshold for a predetermined period of time; and second means for detecting a trailing edge of said object to be detected when both of said first and second signals is greater than said predefined threshold after said leading edge had been detected.

18. The photodetector system of claim 14 wherein:

said object to be detected is disposed on a conveyor to move along a path which extends through said detection zone.

19. The photodetector system of claim 18, wherein:

said light sensitive component and said first and second light sources are aligned along an axis which is generally parallel to said path.

20. The photodetector system of claim 18, wherein:

said light sensitive component and said first and second light sources are aligned along an axis which is generally perpendicular to said path.

21. A photodetector system, comprising:

a reflector;

a first light source, said first light source being positioned to direct a first beam of light in a direction toward said reflector and through a detection zone;

a second light source, said second light source being positioned to direct a second beam of light in a direction toward said reflector and through said detection zone, said first and second light sources being light emitting diodes;

a light sensitive component, said light sensitive component being positioned to provide a first signal which is representative of the intensity of a first reflected beam of light when said first beam of light is reflected back toward said light sensitive component, said light sensitive component being positioned to provide a second signal which is representative of the intensity of a second reflected beam of light when said second beam of light is reflected back toward said light sensitive component;

a pulser for alternatively energizing said first and second light sources to alternatively produce said first and second beams of light, at least one of said first and second beams of light being affected when an object to be detected is within said detection zone, said object to be detected being a partially transparent object;

a comparator for comparing said first and second signals to a predefined threshold; and means for determining the presence of said object to be detected within said detection zone when a magnitude of at least one of said first and second signals is less than said predefined threshold, said object to be detected being disposed on a conveyor to move along a path which extends through said detection zone.

22. The photodetector system of claim 21, wherein:

said light sensitive component is disposed between said first and second light sources.

23. The photodetector system of claim 22, further comprising:

first means for detecting a leading edge of said object to be detected when at least one of said first and second signals is less than said predefined threshold after both of said first and second signals had been greater than said predefined threshold for a predetermined period of time; and second means for detecting a trailing edge of said object to be detected when both of said first and second signals is greater than said predefined threshold after said leading edge had been detected.

24. The photodetector system of claim 21, wherein:

said light sensitive component and said first and second light sources are aligned along an axis which is generally parallel to said path.

25. The photodetector system of claim 21 wherein:

said light sensitive component and said first and second light sources are aligned along an axis which is generally perpendicular to said path.

* * * * *